United States Patent
Sozio et al.

(10) Patent No.: US 9,415,944 B2
(45) Date of Patent: Aug. 16, 2016

(54) ROLLER WHEEL WITH FRICTION RELIEF

(71) Applicant: Unex Manufacturing, Inc., Jackson, NJ (US)

(72) Inventors: Dean Sozio, Hamilton, NJ (US); Charles F. Doty, Visalia, CA (US); Bill Chen, New Taipei (TW)

(73) Assignee: UNEX MANUFACTURING, INC., Jackson, NJ (US)

(*) Notice: Subject to any disclaimer, the term of this patent is extended or adjusted under 35 U.S.C. 154(b) by 0 days.

(21) Appl. No.: 14/319,587

(22) Filed: Jun. 30, 2014

(65) Prior Publication Data

US 2015/0374129 A1    Dec. 31, 2015

(51) Int. Cl.
| | | |
|---|---|---|
| *B65G 39/04* | (2006.01) | |
| *A47B 96/02* | (2006.01) | |
| *B65G 13/11* | (2006.01) | |
| *B65G 39/02* | (2006.01) | |
| *B65G 1/02* | (2006.01) | |

(52) U.S. Cl.
CPC .............. *B65G 39/04* (2013.01); *A47B 96/025* (2013.01); *B65G 1/023* (2013.01); *B65G 13/11* (2013.01); *B65G 39/02* (2013.01)

(58) Field of Classification Search
CPC ........ B65G 13/11; B65G 39/04; B65G 39/02; B65G 1/023; A47B 96/021; A47B 96/025
USPC .......................................................... 193/37
See application file for complete search history.

(56) References Cited

U.S. PATENT DOCUMENTS

| | | | | | |
|---|---|---|---|---|---|
| 3,550,231 | A * | 12/1970 | Rosenkranz | ........... | D02H 13/28 492/47 |
| 4,718,154 | A * | 1/1988 | Bauer | ....................... | G03D 3/13 193/37 |
| 6,685,076 | B2 * | 2/2004 | Couillard | ................ | B65G 39/02 219/127 |
| 7,445,109 | B2 * | 11/2008 | Anderson | ............ | B65G 37/005 193/37 |
| 7,455,165 | B2 * | 11/2008 | Lawless | .................. | B65G 13/00 193/35 R |
| 7,549,524 | B2 * | 6/2009 | Eichhorn | ................ | B65G 39/06 193/37 |
| 7,607,527 | B2 * | 10/2009 | Yazaki | .................... | B65G 39/12 193/35 R |
| 8,646,595 | B2 * | 2/2014 | Miller | .................... | B65G 17/24 193/37 |

* cited by examiner

*Primary Examiner* — Leslie A Nicholson, III
*Assistant Examiner* — Keith R Campbell
(74) *Attorney, Agent, or Firm* — Hoffmann & Baron, LLP

(57) ABSTRACT

A flow shelf roller having an outer circumference, a radially central hub, and an axially central bore forming an inner circumference through the central hub. The inner circumference of each roller has at least one axial relief channel formed therein along the length of the axial bore. In a more particular embodiment, the axial relief channel is formed including a non-perpendicular angle with respect to the inner circumference of the roller. In a more particular embodiment, the axial relief channel includes at least one of an angled chamfer and a radiused corner, adjacent to the inner circumference of the first roller. The disclosure also includes a roller flow shelf including a flow bed roller having any or all of the aforementioned characteristics.

19 Claims, 6 Drawing Sheets

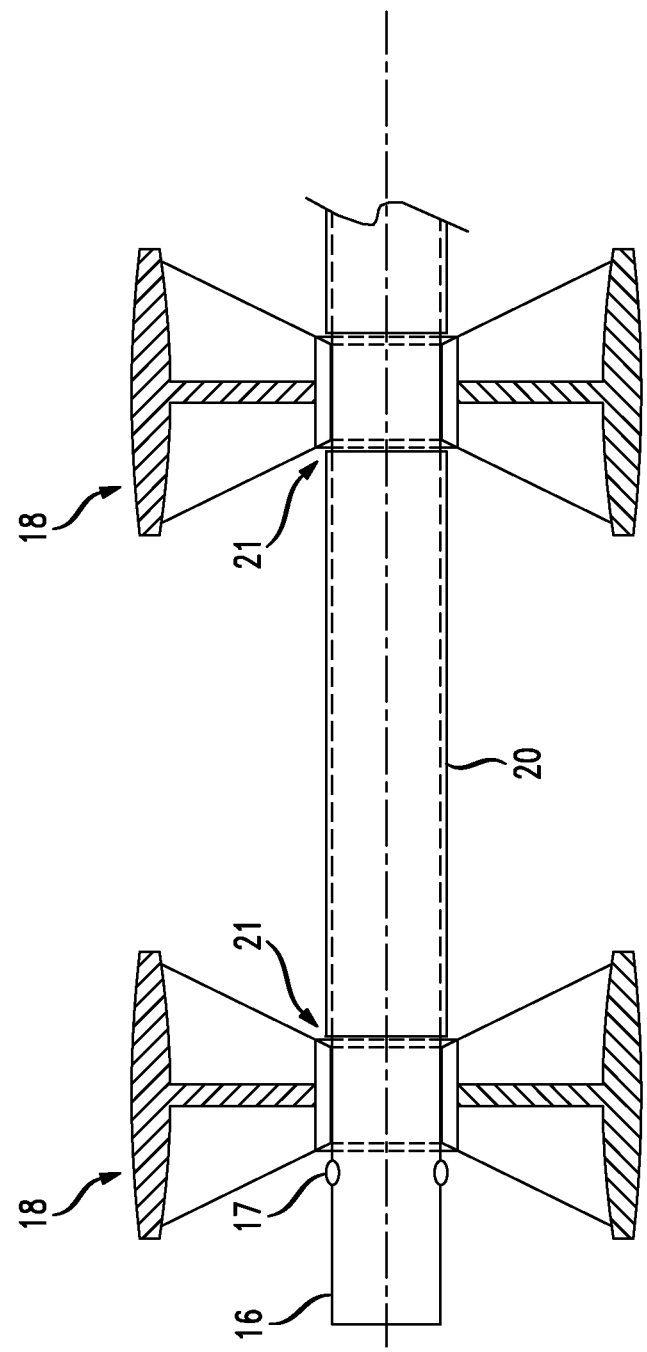

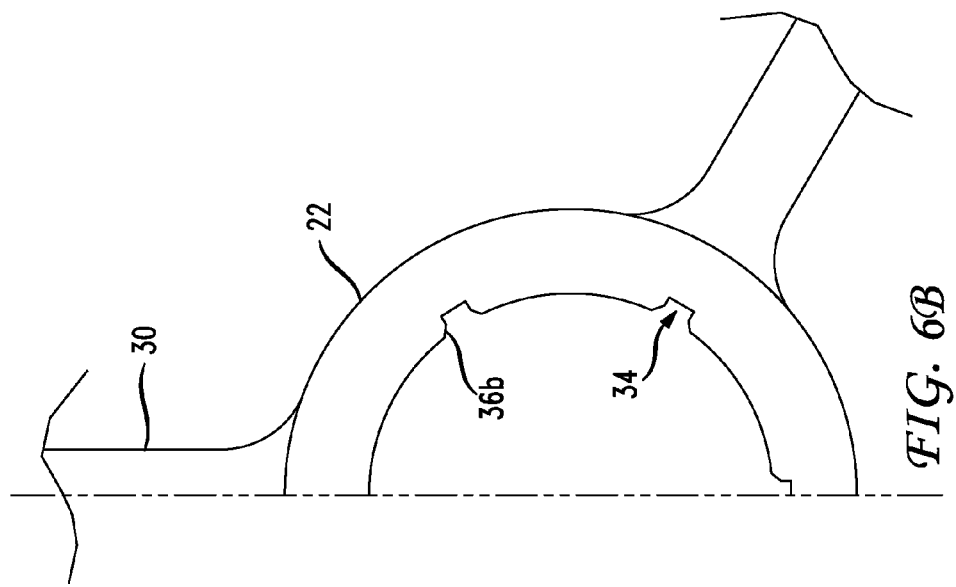
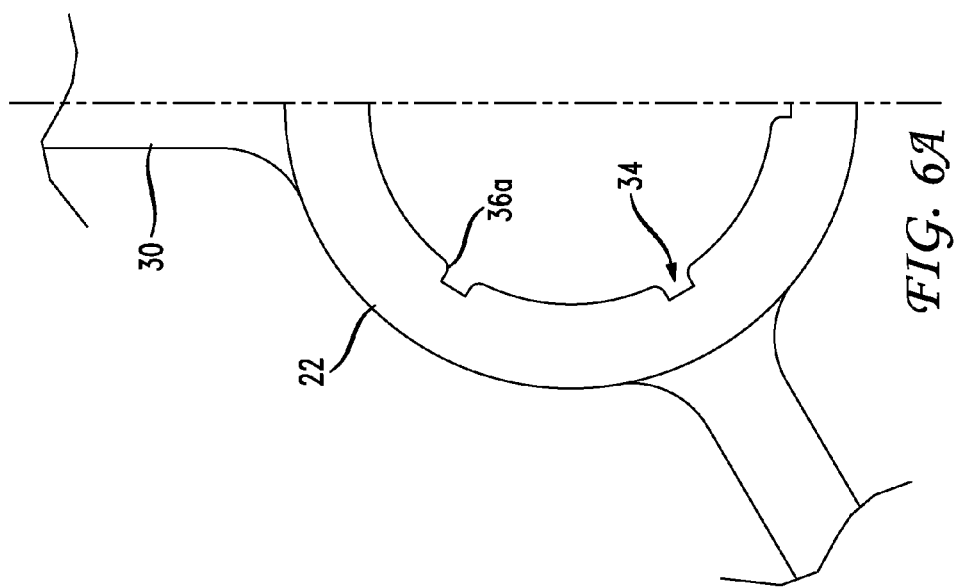

ROLLER WHEEL WITH FRICTION RELIEF

BACKGROUND

1. Field of the Disclosure

The present disclosure relates generally to the field of material handling. More specifically, the present disclosure is directed to a wheel for use in a parcel-handling flow shelf device, and a flow shelf including one or more of such wheels.

2. Brief Discussion of Related Art

A roller bed, or carton flow shelf, for example as marketed by the Assignee of the instant application, is a parcel handling device in which a plurality of wheels or rollers of equal diameter are mounted for rotation around generally aligned axles that are in a common axis plane. Accordingly, a parcel placed on the flow shelf will rest on a transit plane that is offset from the axis plane by the radius of the wheels or rollers, the tangent with the wheels or rollers.

Commonly, the wheels or rollers rotate freely around their respective axles. However, in certain instances some or all of the wheels or rollers in a flow shelf may be driven to move parcels. In a free-rotating flow shelf, to transit parcels along the flow shelf the parcel may be pushed, for example by a human operator or a machine. Alternately, the flow shelf may be mounted at an angle relative to horizontal. Thus, the effect of gravity will influence a parcel placed on a high side of the angled flow shelf to transit towards the low side. This gravity feed effect is resisted by friction between the wheels or rollers against their axles, and also by the inertia of the wheels or rollers themselves.

In order for a flow shelf to operate with maximum efficiency, the wheels or rollers must roll freely with a minimum of frictional resistance. One expedient solution would be to lubricate the rollers and axles. However, in the real application environment for flow shelf devices, e.g., warehouses, airborne particulate matter are trapped by viscous lubricants. In the long term, lubrication may have a net negative effect on the freedom of wheel or roller motion unless time, labor and expense is incurred for continual cleaning and maintenance.

An improved solution for free motion of the rollers compared with the present state of the art therefore remains wanting.

SUMMARY

In order to overcome these and other drawback, deficiencies and weaknesses in the known art, provided according to the present disclosure is a flow shelf roller having an outer circumference, a radially central hub, and an axially central bore forming an inner circumference through the central hub. The inner circumference of each roller has at least one axial relief channel formed therein along the length of the axial bore. In a more particular embodiment, the axial relief channel is formed including a non-perpendicular angle with respect to the inner circumference of the roller. In a more particular embodiment, the axial relief channel includes at least one of an angled chamfer and a radiused corner, adjacent to the inner circumference of the first roller.

In still another embodiment of the present disclosure, the central hub of the first roller has a reduced radial thickness at one axial end thereof. The reduced radial thickness at one end of the central hub may include at least one of an angled chamfer and a radiused corner.

In still another embodiment of the present disclosure, the outer circumference of the first roller is crowned, with a diameter of the first roller taken at a point along its axial length being greater than a diameter of the first roller taken at one axial end thereof. In a more particular embodiment of the flow shelf roller according to the present disclosure, the inner circumference of the roller comprises one or more of high-density polyethylene, nylon, polypropylene, polyvinyl chloride, or some combination thereof.

In a further embodiment of the present disclosure, provided is a roller flow shelf having first and second support rails, which together define a travel path of the flow shelf. A plurality of axles, each having a first outer diameter, connects the first rail to the second rail, with each axle being generally perpendicular to the travel path of the flow shelf. A plurality of rollers is mounted for rotation on at least one of the plurality of axles, a first roller of the plurality roller of the plurality an outer circumference, a radially central hub, and an axially central bore forming an inner circumference through the central hub. The central bore includes a second inner diameter equal to or greater than the first outer diameter of a corresponding axle on which it is mounted for rotation. Further, the inner circumference of each roller has at least one axial relief channel formed therein along the length of the axial bore. In a more particular embodiment, the axial relief channel includes at least one of an angled chamfer and a radiused corner, adjacent to the inner circumference of the first roller. In other regards, a roller flow shelf according to the present disclosure may include a flow shelf roller having any or all of the aforementioned characteristics.

In a more particular embodiment of the present disclosure, a first axle of the plurality of axles has the first roller and a second roller of the plurality of rollers mounted for rotation on the first axle, with a standoff spacer between the first and second rollers. Optionally, the standoff spacer may have a reduced radial thickness at one axial end thereof. In a more particular embodiment, the reduced radial thickness at one end of the standoff spacer includes at least one of an angled chamfer and a radiused corner.

These and other purposes, goals and advantages of the present disclosure will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings, in which like reference numerals refer to like structures across the several views, and wherein:

FIG. 3 depicts an assembly view of an axle 16 having a plurality of wheels 18 and spacers 20 mounted thereon;

FIG. 6A illustrates a partial detailed view of the central hub of a flow shelf wheel according to one embodiment of the present disclosure;

FIG. 6B illustrates a partial detailed view of the central hub of a flow shelf wheel according to an alternate embodiment of the present disclosure;

DETAILED DESCRIPTION

Figure 1:
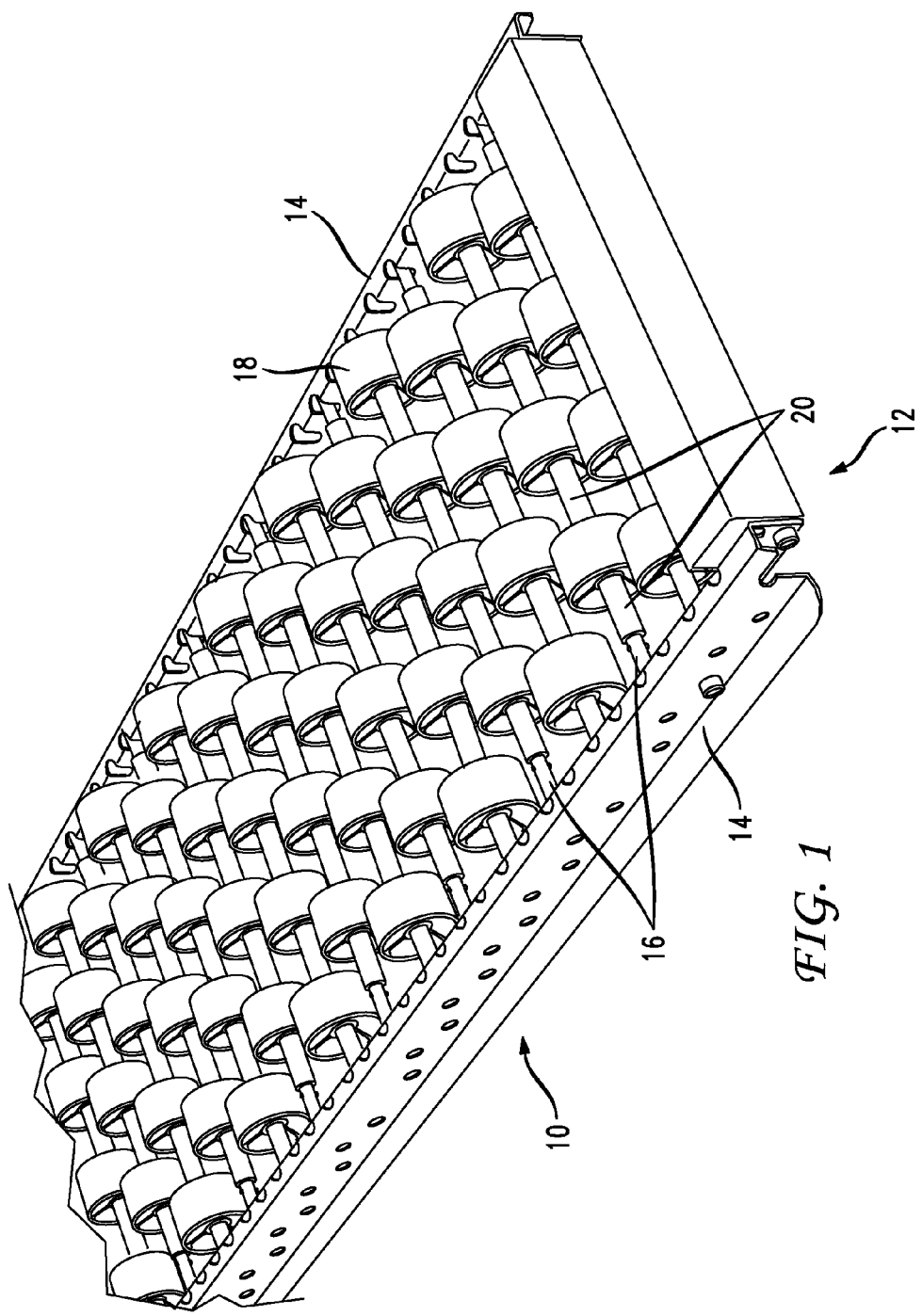
FIG. 1 depicts a perspective view of a flow shelf according to one embodiment of the present disclosure.
Figure 2:
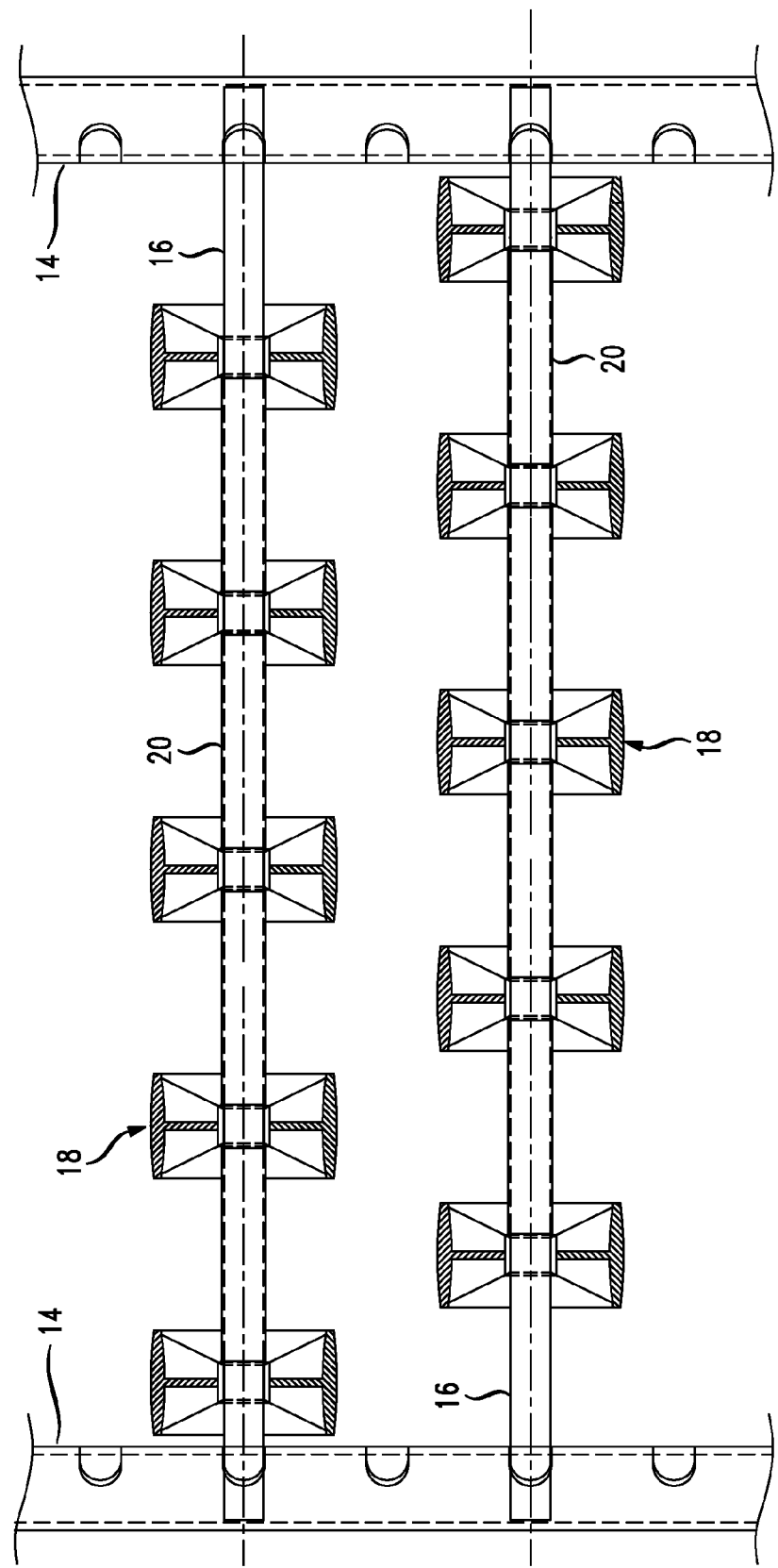
FIG. 2 depicts an overhead plan assembly view of a flow shelf according to the present disclosure.

Referring now to FIGS. 1-3, FIG. 1 depicts a perspective view of a flow shelf, generally 10. FIG. 2 depicts an overhead plan assembly view of the flow shelf 10, including several axles 16 removed for clarity. FIG. 3 depicts an assembly view of an axle 16 having a plurality of wheels 18 and spacers 20 mounted thereon.

A flow shelf 10 includes a frame 12 having two elongated rails 14. Where the flow shelf 10 had a fixed width along its length, the rails 14 will be parallel with each other. In other cases, the rails 14 may be at an angle to one another, such that the flow shelf 10 becomes wider and/or narrower from one end to the other. The rails 14 may be straight or curved. The rails 14 define a travel path of the flow shelf 10, along which parcels traverse the flow shelf 10. The distance between the rails 14 is spanned, and the rails connected by, a plurality of axles 16. The axles 16 each lie generally in a common axis plane, and at each location along the rails 14, the axles lie perpendicular to the travel path. The axles 16 support a plurality of rollers or wheels 18 thereon for rotation about the respective axles 16.

Throughout the present disclosure, wheels and rollers may be used generally interchangeably. In practice, the distinction, if any, is that a roller will typically span most or all of the distance between the rails 14. A wheel 18 will typically be shorter in length. As a result, a flow shelf 10 having wheels 18 may include plural wheels 18 on each axle 16. See, for example, FIG. 3. Multiple wheels 18 sharing the same axle 16 may be separated by a standoff spacer 20 between adjacent wheels. The spacers 20 may be tubular, and placed on or over the axle 16. Alternately, the spacers 20 need only partially surround the axle, and/or may be fixed to the frame 12 of the flow shelf 10. Alternately, or additionally, a wheel 18 may be constrained in its position along an axle 16 by a stop 17 embodied as an increase in the diameter of the axle 16, such that a wheel 18 or a spacer 20 sized to fit closely over the axle 16 is constrained in the axial direction of the axle 16 by the stop 17. The stop 17 can be formed be a localized expansion of the diameter of the axle 16, or by, for example applying a welding operation which has the effect to raise a fillet around the circumference of the axle 16. Alternately, a fastener may be inserted into the axle at a predetermined location to form the stop 17. In one embodiment of the present disclosure, the axle 16 may be pinched or cinched in order to form a peen that functions as the stop 17. These embodiments of the axial stop are offered without limitation to any others as may be or become known to those skilled in the art, taken in light of the instant disclosure.

More particularly, in the case of multiple wheels 18 on an axle 16, the wheels 18 may be laterally staggered from one axle 16 to the next, as illustrated in FIG. 1. Many implementations are possible within the scope of the present disclosure.

Figure 5:
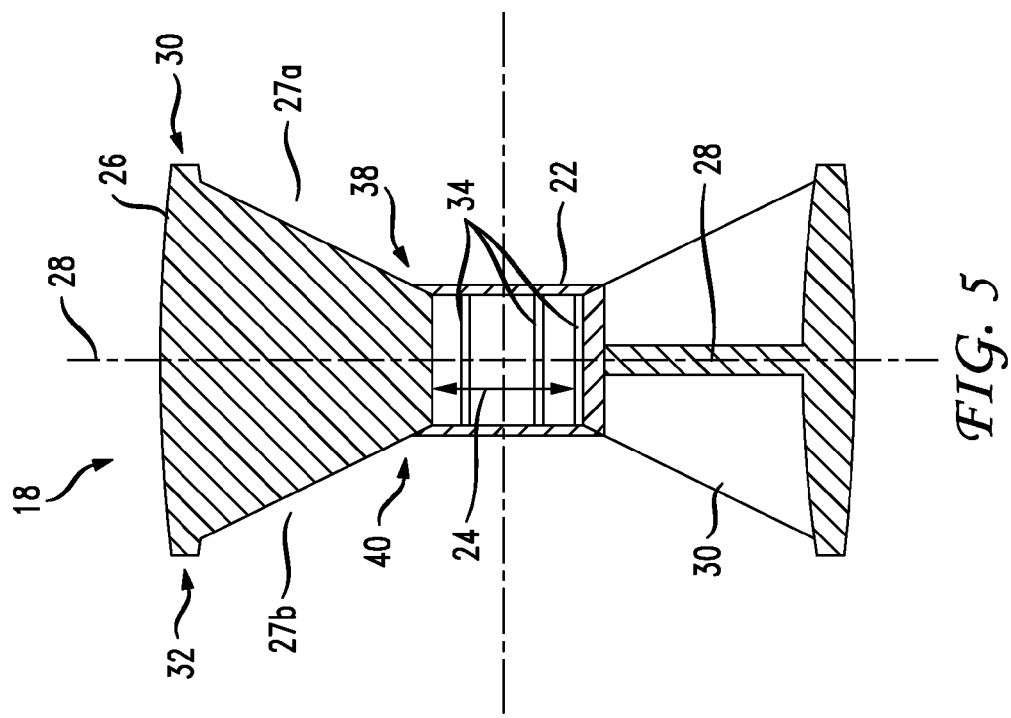
FIG. 5 illustrates the flow shelf wheel shown in FIG. 4, in a cross-sectional view taken along section line 5-5 of FIG. 4.
Figure 4:
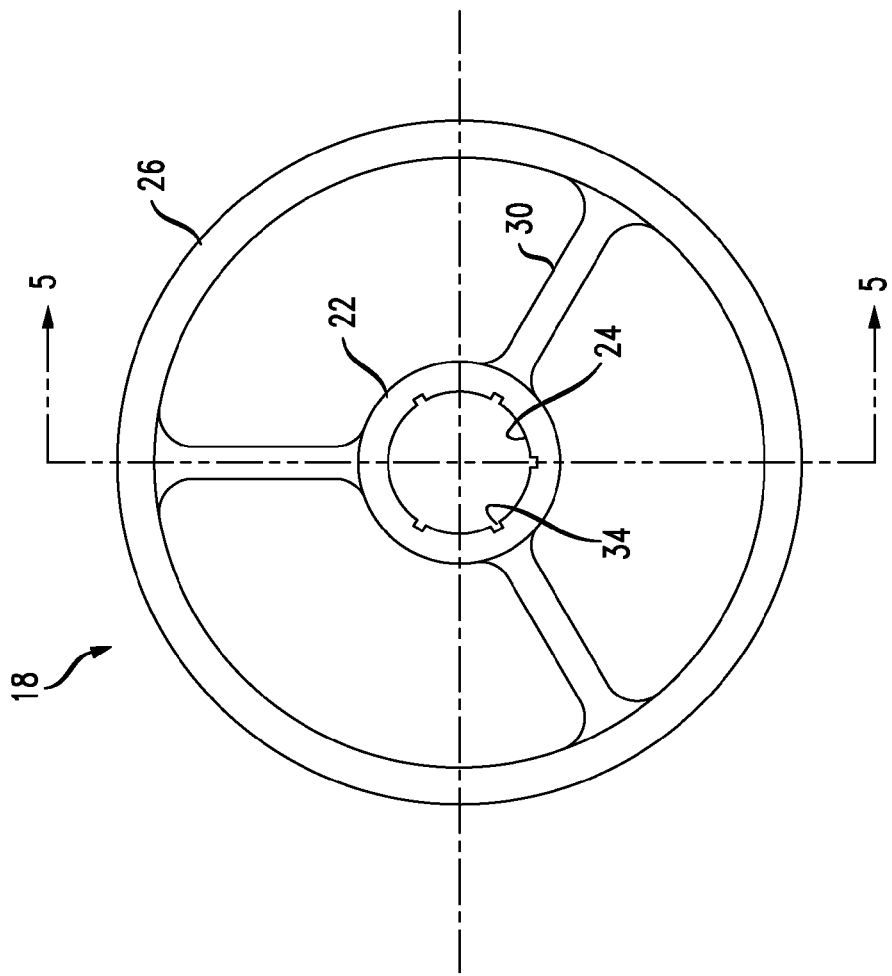
FIG. 4 illustrates in elevation view an embodiment of a flow shelf wheel according to the present disclosure.

Referring now to FIGS. 4 and 5, illustrated is an embodiment of a flow shelf wheel 18 according to the present disclosure, with FIG. 4 showing an elevation view and FIG. 5 showing a cross-sectional view taken along section line 5-5 of FIG. 4. The wheel 18 is provided with a central hub 22, having an inner diameter 24 sized to accommodate a corresponding axle 16. An outer circumference 26 of the wheel 18 is connected with the hub 22 by a web 28 and/or one or more radial spokes 30. In more particular embodiments, the outer circumference 26 is crowned in the axial direction of the wheel 18, such that the wheel 18 and particularly the outer circumference 26 has a greater diameter along a transverse centerline 28 of the wheel 18 and an axial extremity 30, 32. The difference in diameter between the centerline 28 and the axial extremities 30, 32 may be modest or great, and moreover the change in diameter may be gradual and rounded, as illustrated in FIG. 5, or alternately it may be linear and cone- or peak-shaped, alternately the change in diameter may be stepwise and abrupt.

According to an embodiment of the present disclosure, the flow shelf wheel 18 may be constructed such that the outer circumference 26 is longer in the axial dimension of the wheel 18 than the central hub 22. Alternately, this can be described as the wheel 18 exhibiting recesses 27a, 27b, in either or both ends. More colloquially this arrangement can be called a "bow tie" shape, referring to how the wheel 18 appears in cross-section. The recesses 27a, 27b can be, but need not be, complementary in size to each other.

The inner diameter 24 of the central hub 22 is provided with one or more longitudinal recessed channels 34 therein, extending in an axial direction of the central hub 22. With reference now to FIGS. 6A and 6B, illustrated is a partial detail view of the central hub 22 of two respective alternate embodiments. In FIG. 6A, recessed channels 34 have respective rounded filet 36a corners or edges relative to the inner diameter 24. In FIG. 6B, recessed channels 34 have corners 36 or edges of the recessed channels 34 provided having an angled chamfer 36b. This rounding or chamfering also serves to reduce running friction between the axle 16 and the wheel 18. Both embodiments depicted, e.g., FIGS. 6A and 6B share a characteristic that the recesses are formed including a non-perpendicular angle relative to the inner diameter 24 of the central hub 22. This is, however, optional, and the recessed channels 34 may be provided with squared edges 36.

To further reduce running friction of the wheel 18, in certain embodiments the wheel 18, or at least an inner diameter 24 thereof, is formed including a low-friction material, including without limitation a high-density polyethylene (HDPE), nylon, polypropylene, polyvinyl chloride, or some combination thereof, among other materials.

Figure 7A:
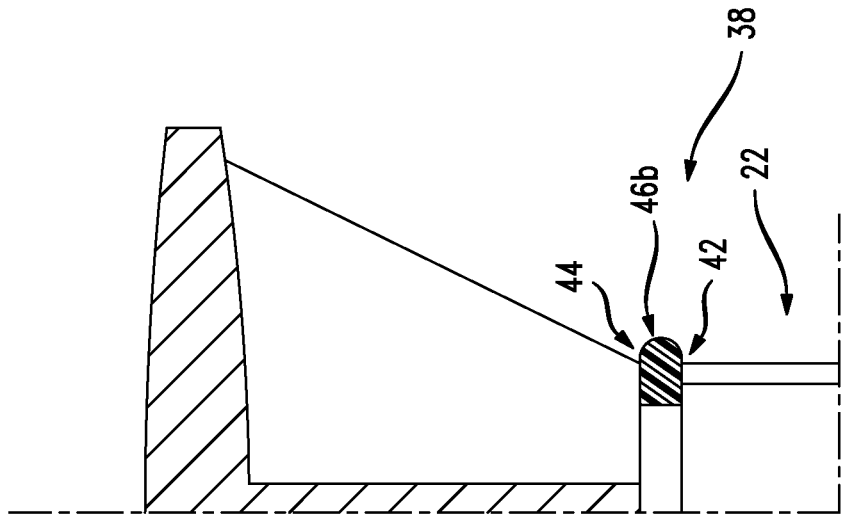
FIG. 7A illustrates a partial detailed cross-sectional view of the central hub of a flow shelf wheel according to one embodiment of the present disclosure.
Figure 7B:
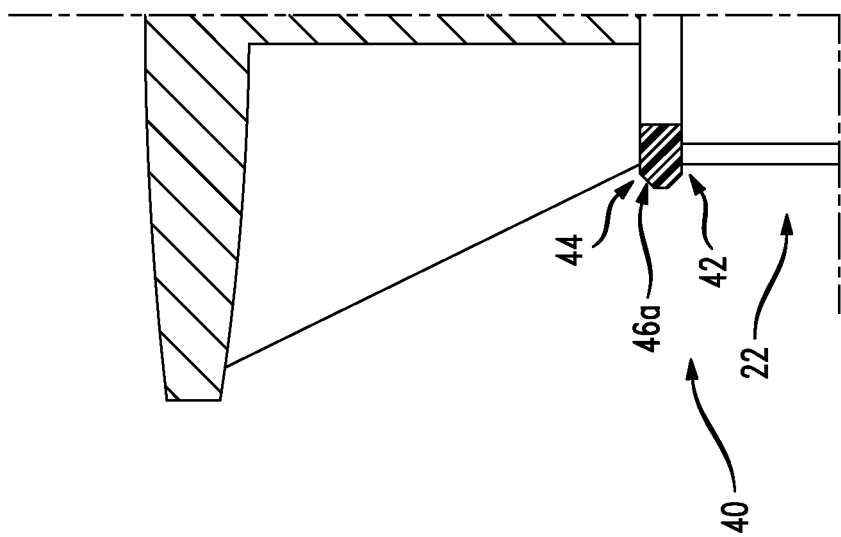
FIG. 7B illustrates a partial detailed cross-sectional view of the central hub of a flow shelf wheel according to still another embodiment of the present disclosure.

Referring now to FIGS. 7A and 7B, illustrated are partial detailed view of the central hub of a flow shelf wheel 18 according to particular embodiments of the present disclosure. To still further reduce running friction of the wheel 18, either or both of axial ends 38, 40 of the central hub 22 is crowned by removing material from either a radially inner side 42 and/or a radially outer side 44 thereof. As illustrated in FIG. 7A, the removal may be in the form of a chamfer 46a. FIG. 7B illustrates the removal in the form of a radius 46b. Alternately, a step-wise reduction in the radius of the central hub 22 may be used, or some combination of the foregoing. However implemented, the effect is to reduce the contact area of the axial ends 38 and/or 40 of the central hub 22, where they may touch the axial ends of one or more spacers 20.

Likewise, in a further embodiment, the spacers 20 may also have one or both axial ends 21 thereof crowned from either or both a radially inner and radially outer dimension, for example by chamfer, radius, and/or stepwise reduction, in a like manner as illustrated in FIGS. 7A, 7B with respect to central hub 22. This will have the effect of reducing an area of contact between the spacer end 21 and the hub 22. Spacers 20, or at least one or both spacer ends 21 thereof, may be formed including a low-friction material, including without limitation a high-density polyethylene (HDPE), nylon, polypropylene, polyvinyl chloride, or some combination thereof, among other materials Variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A roller flow shelf comprising:
   first and second support rails which together define a travel path of the flow shelf;
   a plurality of axles each having a first outer diameter, each axle connecting the first rail to the second rail, and each axle being generally perpendicular to the travel path of the flow shelf; and
   a plurality of rollers mounted for rotation on at least one of the plurality of axles, a first roller of the plurality roller of the plurality having:
   an outer circumference;
   a radially central hub connected to said outer circumference by a web or one or more spokes; and
   an axially central bore forming an inner circumference through the central hub, the central bore having a second inner diameter equal to or greater than the first outer diameter of a corresponding axle on which it is mounted for rotation, wherein
   the inner circumference of each roller having at least one axial relief channel formed therein along the length of the axial bore.

2. The roller flow shelf according to claim 1, wherein the axial relief channel is formed including a non-perpendicular angle with respect to the inner circumference of the first roller.

3. The roller flow shelf according to claim 2, wherein the axial relief channel includes at least one of an angled chamfer and a radiused corner, adjacent to the inner circumference of the first roller.

4. The roller flow shelf according to claim 1, wherein the central hub of the first roller has a reduced radial thickness at one axial end thereof.

5. The roller flow shelf according to claim 4, wherein the reduced radial thickness at one end of the central hub includes at least one of an angled chamfer and a radiused corner.

6. The roller flow shelf according to claim 1, wherein a first axle of the plurality of axles has the first roller and a second roller of the plurality of rollers mounted for rotation on the first axle, further comprising a standoff spacer between the first and second rollers.

7. The roller flow shelf according to claim 6, wherein the standoff spacer has a reduced radial thickness at one axial end thereof.

8. The roller flow shelf according to claim 7, wherein the reduced radial thickness at one end of the standoff spacer includes at least one of an angled chamfer and a radiused corner.

9. The roller flow shelf according to claim 1, wherein the outer circumference of the first roller is crowned, including a diameter of the first roller taken at a point along its axial length being greater than a diameter of the first roller taken at one axial end thereof.

10. The roller flow shelf according to claim 1, wherein the inner circumference of the first roller comprises one or more of high-density polyethylene, nylon, polypropylene, polyvinyl chloride, or some combination thereof.

11. The roller flow shelf according to claim 1, wherein the outer circumference of the roller is longer than the central hub of the roller in an axial dimension of the roller.

12. A flow shelf roller comprising:
    an outer circumference;
    a radially central hub connected to said outer circumference by a web or one or more spokes; and
    an axially central bore forming an inner circumference through the central hub, the central bore having a second inner diameter equal to or greater than an outer diameter of an axle on which the flow shelf roller can be mounted for rotation, wherein
    the inner circumference has at least one axial relief channel formed therein along the length of the axial bore.

13. The flow shelf roller according to claim 12, wherein the axial relief channel is formed including a non-perpendicular angle with respect to the inner circumference of the roller.

14. The flow shelf roller according to claim 13, wherein the axial relief channel includes at least one of an angled chamfer and a radiused corner, adjacent to the inner circumference of the roller.

15. The flow shelf roller according to claim 12, wherein the central hub of the first roller has a reduced radial thickness at one axial end thereof.

16. The flow shelf roller according to claim 15, wherein the reduced radial thickness at one end of the central hub includes at least one of an angled chamfer and a radiused corner.

17. The flow shelf roller according to claim 12, wherein the outer circumference of the first roller is crowned, including a diameter of the first roller taken at a point along its axial length being greater than a diameter of the first roller taken at one axial end thereof.

18. The flow shelf roller according to claim 12, wherein the inner circumference of the first roller comprises one or more of high-density polyethylene, nylon, polypropylene, polyvinyl chloride, or some combination thereof.

19. The flow shelf roller according to claim 12, wherein the outer circumference of the roller is longer than the central hub of the roller in an axial dimension of the roller.

* * * * *